Figure 3:
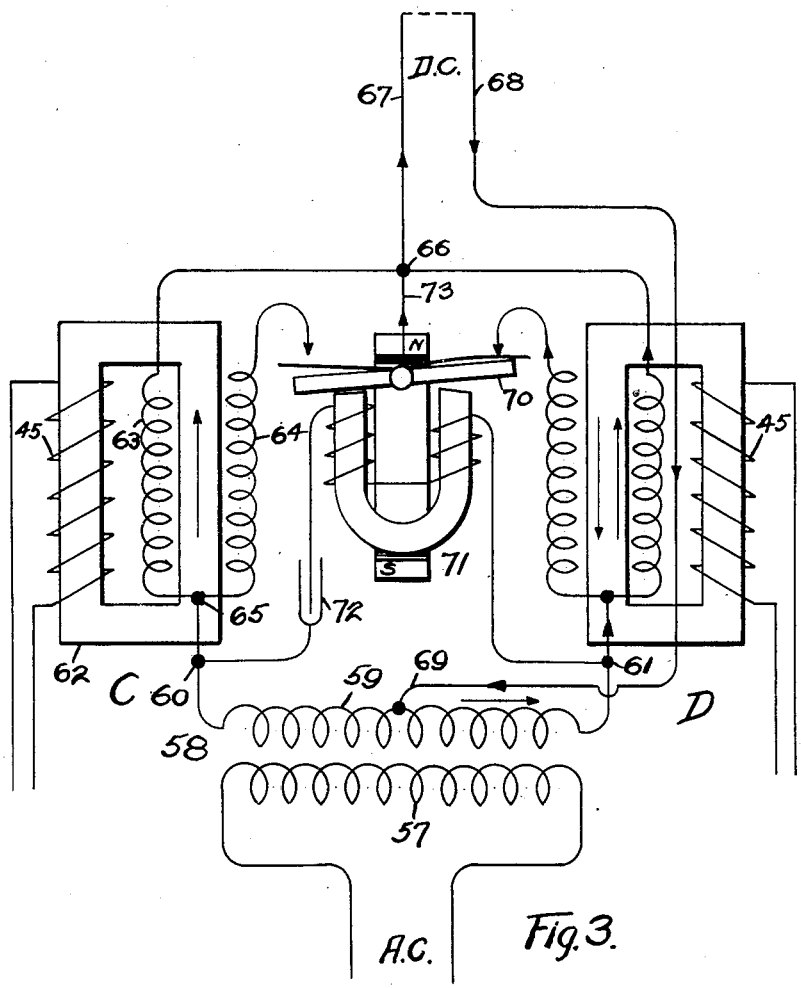

R. A. ENGLER.
ELECTROMAGNETIC RECTIFIER AND CURRENT REDRESSER.
APPLICATION FILED MAR. 23, 1914. RENEWED NOV. 12, 1919.
1,394,815.
Patented Oct. 25, 1921.
4 SHEETS—SHEET 1.
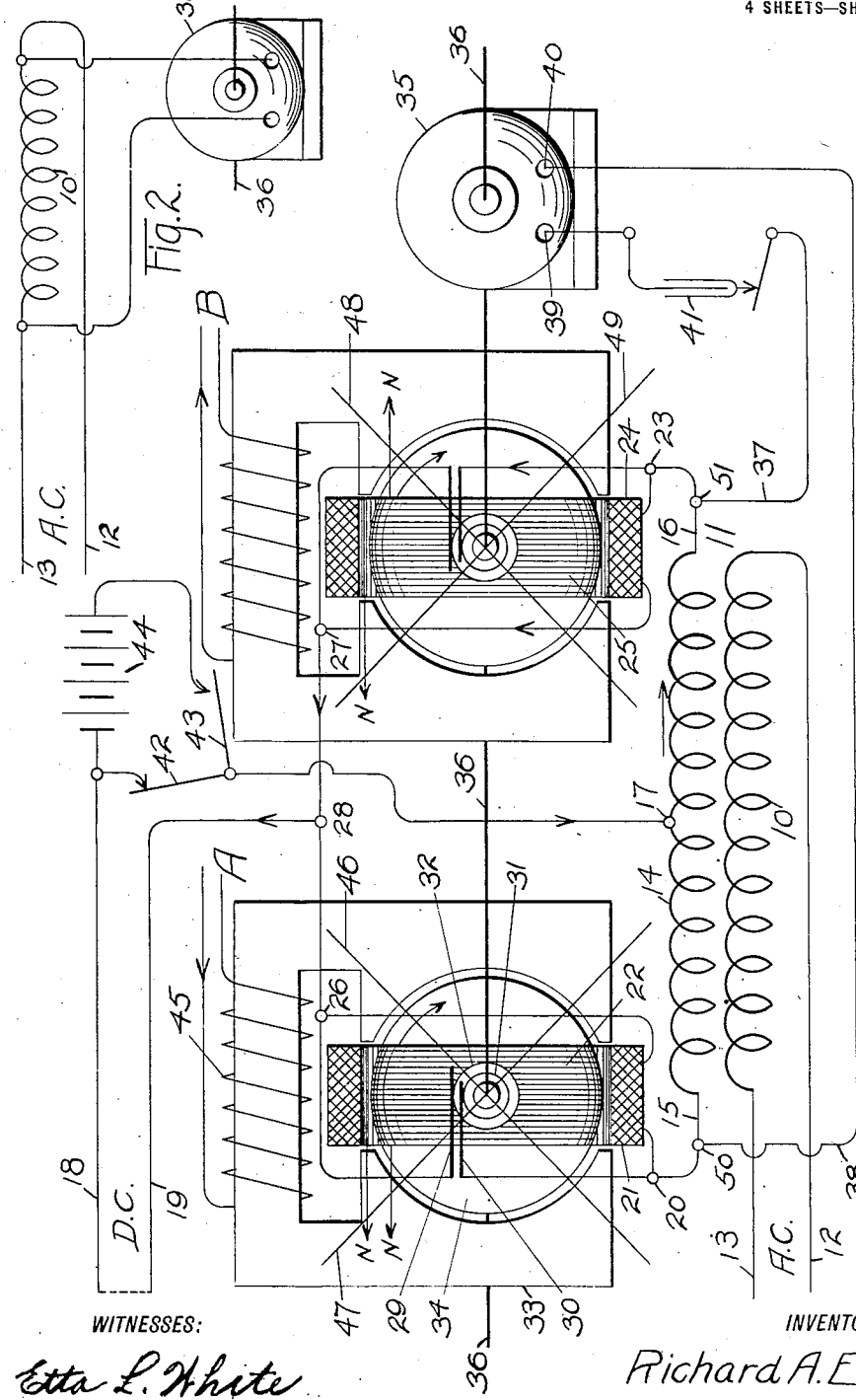
WITNESSES:
Etta L. White
Dwight B Cheever
INVENTOR
Richard A. Engler.
BY
G. L. Cragg
ATTORNEY R. A. ENGLER.
ELECTROMAGNETIC RECTIFIER AND CURRENT REDRESSER.
APPLICATION FILED MAR. 23, 1914. RENEWED NOV. 12, 1919.
1,394,815.
Patented Oct. 25, 1921.
4 SHEETS—SHEET 3.
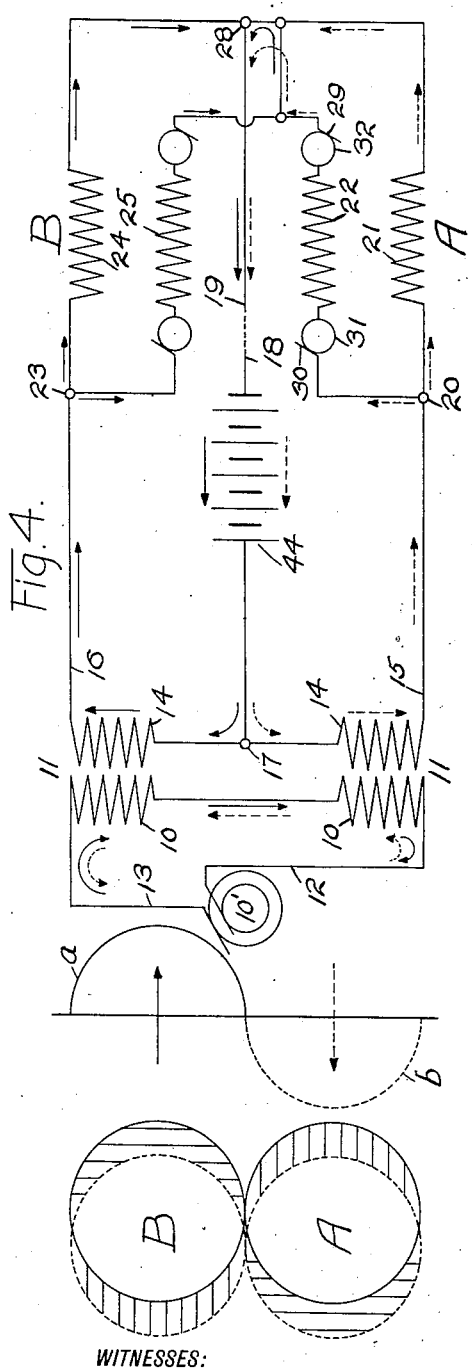
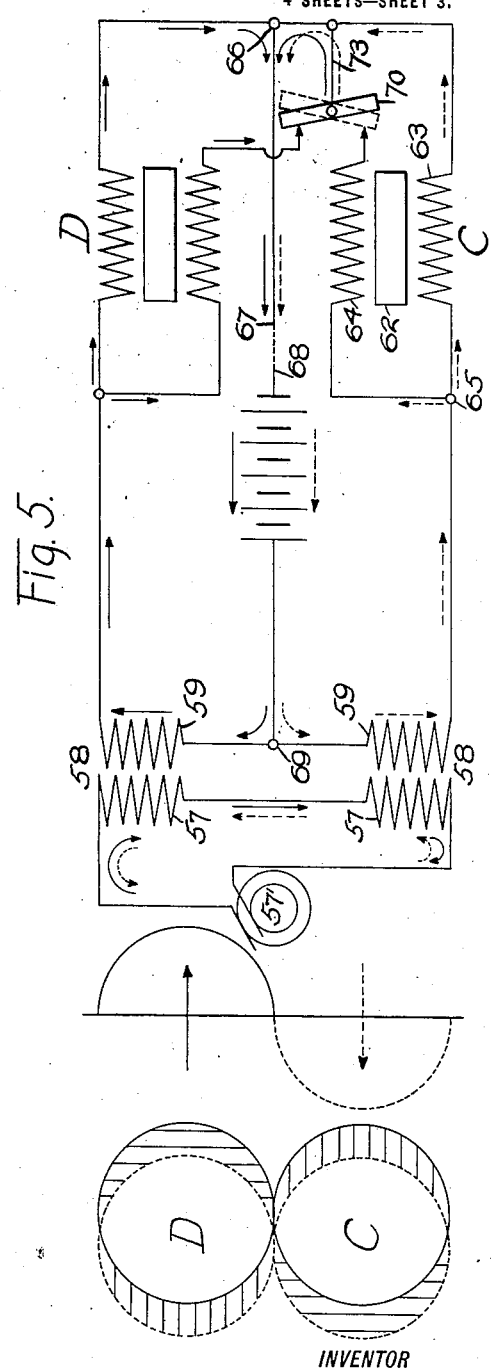
WITNESSES:
Etta L. White
Dwight B. Cheever
INVENTOR
Richard A. Engler.
BY
ATTORNEY R. A. ENGLER.
ELECTROMAGNETIC RECTIFIER AND CURRENT REDRESSER.
APPLICATION FILED MAR. 23, 1914. RENEWED NOV. 12, 1919.
1,394,815.
Patented Oct. 25, 1921.
4 SHEETS—SHEET 4.
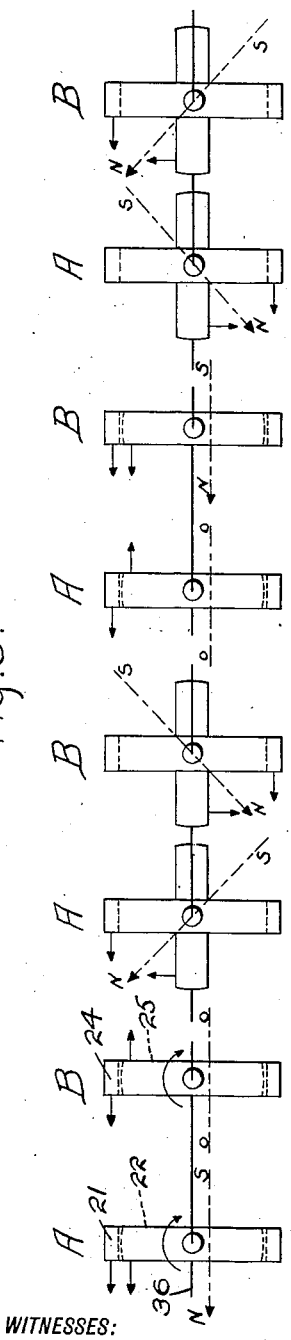
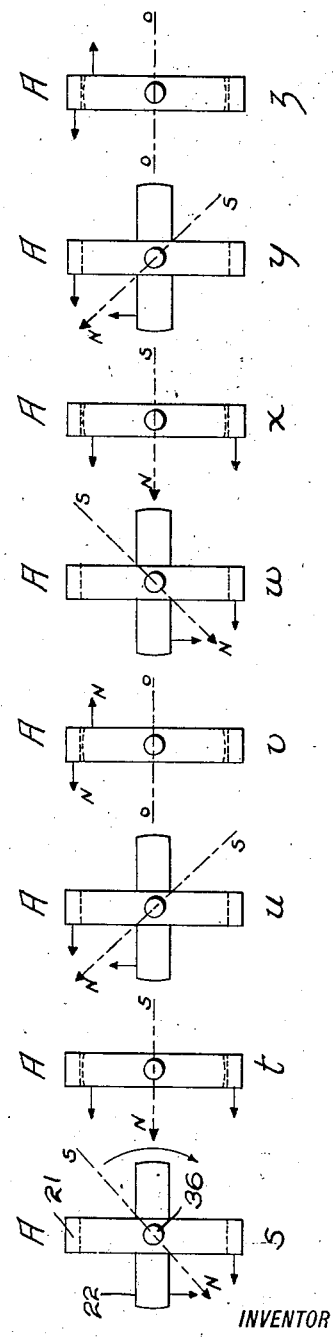
WITNESSES:
INVENTOR
Richard A. Engler.
BY
ATTORNEY

UNITED STATES PATENT OFFICE.

RICHARD A. ENGLER, OF DUBUQUE, IOWA.

ELECTROMAGNETIC RECTIFIER AND CURRENT REDRESSER.

1,394,815. Specification of Letters Patent. Patented Oct. 25, 1921.

Application filed March 23, 1914, Serial No. 826,484. Renewed November 12, 1919. Serial No. 337,628.

*To all whom it may concern:*

Be it known that I, RICHARD A. ENGLER, citizen of the United States, residing at Dubuque, in the county of Dubuque and State of Iowa, have invented a certain new and useful Improvement in Electromagnetic Rectifiers and Current-Redressers, of which the following is a full, clear, concise, and exact description, reference being had to the accompanying drawings, forming a part of this specification.

My invention relates to systems of electrical distributions and involves an apparatus for changing the form of current. I have employed the apparatus of my invention in rectifying alternating currents, in converting direct current into alternating current and in converting one alternating current into another.

When my invention is adapted to the conversion of alternating into direct current a wave throttling means is caused to function in synchronism with alternate alternating current waves (that is waves having one sign or direction) then to oppose the passage of current from the source of alternating current to the direct current system, said throttling means being inert when the alternating current waves of the reverse sign or direction are being impressed, whereby the passage of these latter waves to the direct current system is alone permitted by said wave throttler. Two such wave throttlers are preferably employed, one functioning only when alternating current waves of one direction are being impressed and the other functioning only when alternating currents of the reverse direction are being impressed, whereby the waves of one direction are permitted passage by one throttler and the waves of the other direction are permitted passage by the other throttler. The circuit connections associated with these two devices by which current is permitted passage to the direct current system are such as to cause the alternating current waves of one direction to be reversed in the direction of their passage to the direct current system, while the other alternating current waves pass to such system in their normal direction. In this way all of the alternating current waves are passed in uniform direction to the direct current system to flow in such system as rectified alternating, or direct, current. The reactance employed in the throttling devices is preferably furnished by inductance which arises to throttle the waves and disappears to permit their passage.

The equipment and method of my invention may be so employed as to dispense with commutators and circuit opening and closing contacts and may fulfil purposes for which the rectifiers and reorganizers of the prior art have been devised. The invention enables the production of a rotating magnetic field for converting a direct current into an alternating current and also enables the production of a rotating magnetic field for converting one alternating current into another by mutual induction.

In the operation of my apparatus I prefer to make use of sets of coils which are caused to be non-differential or inductive and differential or non-inductive periodically and in synchronism with the waves of an alternating current that is supplied, or that is generated by the apparatus itself.

In one case I use rotation of certain coils as the means for causing proper coöperation between the coils; in another case I employ opening and closing contacts, with all coils stationary. No sparking can take place in the latter method because the "Lenz" or induction law is reversed in my combination of coils.

The invention and various uses to which it may be put will be more fully explained by reference to the accompanying drawings showing preferred embodiments of the apparatus thereof and in which Figure 1 is a view diagrammatically illustrating the structure and some of the circuit arrangement of one equipment; Fig. 2 shows a slight modification of a part of the equipment of Fig. 1; Fig. 3 is a view diagrammatically illustrating the structure and some of the circuit arrangement of another equipment; Figs. 4 and 5 are more complete diagrammatic illustrations of the equipment and operations illustrated respectively in Figs. 1 and 3. Fig. 6 is also further illustrative of the equipment of Fig. 1; and Fig. 7 diagrammatically illustrates other operations.

Like parts are indicated by similar characters of reference throughout the different figures.

Reference is first made to Figs. 1 and 4 which illustrate the rectification of alternating current. There is employed a primary 10 of a transformer 11 that is fed with alternating current from any source 10 by means of the leads 12 and 13. A secondary 14 is provided which is split in the middle by attaching a terminal 17 at that point. End terminals of the secondary are designated 15 and 16. These end terminals connect each with a unit in which the rectification takes place, these units being called A and B which are of similar construction. Central terminal 17, of the secondary, leads to the direct current feed wire 18. At unit A terminal 20 connects with the end terminal 15 of the secondary. A stationary coil 21 and rotary coil 22 each have one terminal connected with terminal 20. At B two similar coils 24 and 25 connect with terminal 23 which in turn connects with end terminal 16 of the secondary. Current flowing from each end terminal of the secondary therefore finds two paths at each unit through the coils of that unit, which paths at A again unite at 26 and at B at 27; and these two terminals connect with 28, which is the terminal of the other direct current feed wire 19.

Terminals 20 and 26 at unit A connect with the terminals of the revolving coil 22 through the medium of brushes 29 and 30 and slip rings 31 and 32, which latter revolve with the coil. In a similar manner coil 25 at B connects with terminals 23 and 27. At A, an iron path 33 is provided for the lines of force from coils 21 and 22, while the magnetic core 34 is provided for the same coils, which core may either revolve with coil 22 or remain stationary.

A synchronous alternating current motor 35 serves to drive the rotating elements 22, 25 of units A and B by means of a shaft which is represented by the line 36. A shunt circuit from the ends 15 and 16 of the secondary 14 feeds the motor 35. Lines 37 and 38 help form this shunt circuit and connect with terminals 39 and 40 of the motor. In line 37 is interposed a condenser 41 which serves to neutralize the impedance in the motor circuits, thus avoiding any lag of current in the secondary 14. The motor may be in shunt of the primary 10 as indicated in Fig. 2. The motor may be a small one, just big enough to overcome friction. The rotating coils of both units A, B may be given a forward or backward lead on the shaft so as to get their rotation and coöperation with the stationary coil in step with the alternating current waves and passage of which they are to control. In direct current line 18 are switches 42 and 43. With switch 42 closed and switch 43 open the battery 44 is cut out of circuit. Closing switch 43 and opening switch 42 puts the battery in series with the rectifier. At unit A is shown a coil 45 which plays no part in the rectification or de-rectification but is the secondary of a transformer when my apparatus is used for transforming by mutual induction from a direct current to an alternating current or from one alternating current to another alternating current.

Lines 46 and 47 at A and 48 and 49 at B are the approximate positions of the rotating coils when the alternating current waves are passing through their maximum rate of change. These lines of course take up positions forward or backward of those shown depending upon the wave form. In the position of the coils as shown the alternating current waves are at their crests, while when the coils of each unit are at right angles to each other the waves are at zero. In the zero position of the coils both units are equal as to their inductive and non-inductive properties. The straight horizontal arrows (N) at A show the direction the lines of force from coils 21 and 22 tend to take and since they are in the same direction the coils are inductive or non-differential. At B the lines of force from coil 24 tend to take the same direction as those at A, but coil 25 causes lines tending to appear in the opposite direction which then makes these two coils non-inductive or differential.

Let the north pole be on the left and the south pole on the right in both units when inductive, or to put this another way let it be said that the polarity of the stationary coils of both units are north on the left and south on the right and of the rotating coils when parallel with the stationary coil, one is the same and the other the opposite and so alternately, for convenience of description. However, the polarity in both coils of a set may be reversed in one or both units because it is not the direction of lines of a particular set of coils and poles, but how the lines and poles coöperate in the units which is of importance. Therefore at unit A wave $a$ (Fig. 4) is throttled, while at unit B it is allowed to pass. This being the case current flows as shown by the arrows in Fig. 1 and the full line arrows in Fig. 4 and the half of the secondary 14 from 17 to 16 is active while the other half is dead, omitting reference to the driving motor current. The next wave $b$ (Fig. 4) will be accompanied by a reverse order of conditions because the coils 22 and 25 will have turned so as to reverse the inductive properties of the coöperating coils, and current due to wave $b$ (Fig. 4) then flowing in the direction indicated by dotted arrows in Fig. 4. If we only have one unit such as A or B, only alternate waves pass, the intervening waves being blotted out. The curved arrows in Fig. 1 indicate the rotation to be clockwise, but the rotation may be in either direction. The alternating current feed wires 12 and 13 may connect at 50 and 51, cutting out the primary 10. In this event the secondary 14 becomes an auto-transformer or compensator and the apparatus operates exactly as before. The auto-transformer coils may also be replaced by reactance or impedance coils. The coils of units A and B are wound for low ohmic resistance but the proper amount of impedance for certain speeds and frequencies which can vary one with the other two. Therefore the loss in my converters can be reduced to a small factor, thereby making the apparatus very efficient.

Assuming that coil 22 starts from a zero position (which is one quarter turn to the left from the position shown in Fig. 1 and at the upper end of the vertical diameter of the circle A, Fig. 4), as such coil turns through its first quarter in a clockwise direction to the position shown in Fig. 1, the first half of wave $a$ starts from zero and ends at its maximum, coil 22 then having the position indicated in Fig. 1. One quarter turn of coil 22 causes an eighth turn and a tendency to increase in strength of an imaginary resultant. Enough current flows in the units when passing through the no load or inductive intervals or periods to overcome the resistance of the coils, being in this respect like the primary of a transformer at no load. A very weak resultant only appears, which having no value, I call imaginary. As the coil 22 turns through its second quarter the second half of wave $a$ drops from maximum to zero and the imaginary resultant falls to zero. As will be noticed the coils 21 and 22 so coöperate as to make them inductive during this first half revolution, which therefore enables unit A to throttle any current that tends to flow through them during the flow of wave $a$. At the end of the third quarter turn of coil 22 the next wave $b$ is brought to maximum but in reversed direction to the first wave $a$. The imaginary resultant therefore in rising changes its polarity. The two fields of the coils 21 and 22 now oppose each other exactly. During the last quarter turn of coil 22 the last half of wave $b$ drops from maximum to zero and the imaginary resultant will fall. The coils 22 and 21 in the last half revolution of coil 22 thus coöperate in such manner that the wave $b$ is permitted to be passed through the coils of unit A when thus non-inductively disposed. The imaginary resultant has only passed over an arc of 180° for a 360° arc of travel of the coil 22. The operations above described are also illustrated in part in Fig. 6. The resultant is indicated by dot and dash lines. Unit B similarly operates to pass wave $a$ while the passage of such wave through unit A is prevented and obstructs the passage through it of wave $b$ while unit A permits the passage of this latter wave. The decrease of resultant due to the increase of opposition of the fields increases in the same ratio as the rise of strength of current and fields from zero to maximum and there is therefore no inductive or retarding effect on current flow. It will be unnecessary to follow the operations further as it is believed the results will now be thoroughly understood.

When the coils turn into the non-inductive position the alternating current wave and current rises, but the resultant decreases, both actions neutralize each other and at the same time the coils and fields oppose each other. Since each half cycle is passed by its corresponding unit and the units are in parallel in the line 18 and 19, the two waves $a$, $b$ will appear as a pulsating direct current on the line.

The reciprocal property of the apparatus of Fig. 1 will now be explained.

Let direct current from any source feed the units A and B by means of lines 18 and 19. Lines 18 and 19 may be brought directly into connection or "shorted" and the switch 42 opened and switch 43 closed, whereupon the battery or other direct current source 44 could be used as the source of supply, it having been possible to charge this battery, if a storage battery, during the operations outlined above in detail. Also let the rotating elements of the whole system including the motor 35, be rotated by some outside means and at such speed that self-induction comes into play in the coils by the rapid change of magnetic flux caused by the changing resultant field strengths of said coils.

Starting the description of operation of the apparatus all set as in the position shown in Fig. 1, the direct current divides equally between the two units, A, B. Both coils rotate in a clockwise direction, for example. It may be of advantage in starting the apparatus to have the machine rotating at the right speed before switching on the direct current then both units would be in some phase of their inductive and non-inductive conditions. At A the resultant in a half revolution tends to decrease, at B at the same time it tends to increase. A decrease of lines aids the current flowing, while an increase opposes the current. At A the decreasing of lines caused by a coming together of the coils into a differential combination by the rotation, increases the flow of current thus tending to stop the fall of lines of the resultant, while at B the rising of the lines by opening of the coils into a non-differential combination by the rotation, causes a counter electromotive force to appear and thus a reverse current which prevents the rise of lines of the resultant.

Stated in another way, at A as the lines of force of the resultant fall the current rises causing a holding of the lines because more current flows, these two actions aiding each other till zero rate of change of flux and maximum flow of current. Simultaneously with these actions and reactions the coils gradually turn into complete non-inductive positions, all conditions thus allowing a free path through the coils.

At B the rising lines of force of the resultant decrease the current flowing and the decreasing of the current holds down the lines of force of the resultant, these two actions and reactions aiding each other till zero rate of change of flux and minimum flow of current. Simultaneously with these actions and reactions the coils gradually are turning into the inductive position, all of which actions thus choking out the current. Therefore the current from the source of supply is forced out and prevented from flowing through B, but can flow through A. The positions of the rotating coils of both units have been reversed in this half revolution just completed, with all the current supply going through A.

Now the units are ready regularly to shift the whole direct current supply from one unit to the other. In the next half revolution the lines of the resultant at A begin gradually to rise and reach a maximum of change, when the coils are again parallel and inductive. The same half revolution causes the resultant lines of force at B to fall gradually from a maximum to zero rate of change, when the coils are again parallel and non-inductive.

At A the action is to oppose the current flowing, while at B the current flow is aided. Therefore the current leaves A and flows into B till the whole direct current supply is now flowing through B. This revolution therefore caused the direct current to be a maximum first in A and then in B causing one cycle of alternating current to appear in the winding 10 which of course is now a secondary. If this winding 10 as a secondary is open or has resistance, the direct current flow in the units will be regulated in a manner such as in any alternating current transformer, by the reaction of the winding 14 (now a primary) on itself. Each succeeding revolution causes the direct current to rise to a maximum and fall to zero again in one unit, while at the same time the direct current falls to zero and rises again to a maximum in the other, thus the units alternate the flow of direct current. So each half of the winding 14 has a current in one half falling while the other half has a rising current and vice versa, and flowing in opposite directions, there being thus consequent polarities and a falling north and rising south or vice versa acting on the winding 14.

The direct current flows out of one unit in the same proportion that it flows into the other. The result is that the line direct current remains in an unvarying state of continuity. Only enough current flows in the unit that is made, for the instant, inductive or inactive to overcome the resistance of its windings in which its action is then like an alternating current transformer on no load. A weak resultant only then occurs. For instance as the coils are shown in the drawing, A is closed while B is open. A has no resultant or a weak one due to the small current flowing to overcome the resistance of the coils, while at B there is none because the coils are differential. When the coils rotate the weak resultant at A begins to fall which aids the weak current flowing, this causes a little more resultant magnetism, which falling again by rotation reacts again keeping the resultant weak, but the current increases in strength till the resultant action and reaction becomes zero when the coils become differential and the current a maximum. At the same time at B a weak resultant makes its appearance which causes an electromotive force opposing that of the current flowing which reduces the current and the resultant, but the rotation increases the resultant and so these actions and reactions following each other till the resultant change and the current are zero and the coils non-differential; and no current can flow back. A true sine wave or any other wave form desired can be produced. The width of the coils will govern this to some extent. The tendency is toward a flat top wave with coils as shown, because the longer the fields oppose each other, the longer the current flows and the flatter would be the wave tops. In other words, at A with the coils stationed as shown the resultant fall cannot take place at once because the resultant will tend to be crowded around in the direction of rotation in the early part of the rotation; and at B no resultant can rise in the early part of the rotation because the two fields will still neutralize each other almost completely.

When the alternating current is started in the winding 14, now a primary, some of the current of course is shunted through the motor 35 which causes it to take up the load and the outside power required to start the converter can be dispensed with, as it is then driven automatically.

Several such sets can be operated each out of phase with the other so that when all the secondaries are properly connected together any form of polyphase current is available.

Having now shown how an alternating current can be rectified and a direct current alternated by the same apparatus, it remains to be shown that both operations can take place at the same time in the same apparatus.

Let line 18 and 19 be shorted and switch 42 opened and 43 closed, which puts battery 44 in series with the rectifier. Alternating current lines 12 and 13 can also be connected to a source of energy. It has been pointed out previously that in the position of the coils shown in the drawing, the unit A has just been closed to alternating current as well as direct current while unit B has just been opened to both. Furthermore the revolving coils are in the position when the alternating current and direct current waves are at a maximum.
Starting the explanation at unit B, the alternating current wave and direct current flow are at a maximum, as has been said. Taking the alternating current wave first, as rotation continues, the wave drops in synchronism with the rotation, thus a resultant rises that tends to cause retardation of current flow and the current falling tends to aid the current flow with the result that the current drops unretarded to zero in phase therefore with its own electromotive force. The coils turn from the differential position at the same time. The above takes place in 90° of rotation. Going back to the start of this 90° rotation and taking the direct current. The alternating current resultant is kept at zero as above explained but since the direct current is superposed on the alternating current it follows that the direct current resultant must tend to appear and in doing so retards the current flow and weakens the resultant, but the resultant increases on account of rotation which reacts on the current some more and so these actions and reactions continue until there has been rotation through 90° and the direct current greatly reduced in strength.

At A in this same quarter turn the alternating current wave is absent because the coils are inductive, but the direct current begins to flow into A as it flows out of B because the resultant falling due to the coils turning into the differential relationship induces currents tending to aid the current flow while the rising current tends to reduce it, the two neutralize each other keeping the resultant in the same weak strength; and free passage is provided for the rising direct current through A.

Going back to B and starting the second quarter turn the reversed alternating current wave rising cannot enter because B is becoming non-differential or inductive. The direct current still continues to fall as in the first quarter and at the end of the second quarter has dropped to zero. At A again in this second quarter, the alternating current wave is rising in A because A is turning non-inductive or in other words, the actions and reactions neutralize each other and a free path is provided through A for this half cycle alternating current. The direct current continues to rise to a maximum in the second quarter at A as fast as it drops to zero in the same quarter at B.
In the same manner the direct current is shifted from one unit to the other while the alternating current is barred from one unit and then the other; and the direct current and alternating current want to flow through the same units and in synchronism with each other; with the result that they are superposed.

If several such pieces of apparatus as Fig. 1 are used as rectifiers only and each rectifier operates on an alternating current of different phase from the others, and these phases are regularly ordered, then when all rectifiers are connected in series, a continuous direct current results. Thus a direct current flows through each rectifier while it is operating. Whether the direct current comes from a battery such as 44 or some other source or whether it comes from several different phased rectifiers in series is therefore immaterial. What has just been explained with reference to the battery 44 holds good when polyphase currents are used and the several rectifiers are in series. The rectifiers themselves may be made polyphase, when the same conditions are met and fulfilled.

A three phase rectifier would require three units, each with its rotating coil set at an angle of 120° and with obvious circuit arrangement.

It now remains to explain Fig. 1 as a transformer by mutual induction, transforming from direct current to alternating current. Fig. 1 as such a transformer is also reciprocal. It is best to explain Fig. 7 first because the theory of the creation of a rotating magnet field is here explained and this is the field required in the operation of Fig. 1 as a mutual induction transformer. The positions of the coils of either unit through two revolutions are shown in Fig. 7 and whose actions are understood from the description in connection with Figs. 1, 4 and 6. I have designated eight quarterly positions of Fig. 7 by letters from $s$ to $z$. A direct current flows through the coils continuously for causing the homopolar rotating fields.

At $s$ the current in the two coils causes a resultant field north—south. The first quarter turn of the rotating coil brings it to position $t$ with the resultant shifted in the direction of rotation one-eighth of a revolution; and being at a maximum strength. The second quarter turn of the coil is shown at $u$ and the resultant shifted another one-eighth turn. The third quarter turn shows the coils in the position at $v$ where the resultant is nil because the fields exactly oppose each other. The last quarter turn takes up the position $w$, which is the same as $s$, both as to coils and resultant polarity and position. The next revolution through $w$, $x$, $y$, $z$ and $s$ is a duplicate of the first in results. It will now be evident that the resultant increases to a maximum from zero and dies down to zero again in one revolution. One revolution therefore causes one complete cycle of alternating current in a secondary coil the rotating field acting as a primary. At $t$ the resultant is a maximum; at $v$ zero. This wave is a true sine wave or nearly so; and is exactly like any magnetic field that is gradually rising and falling;
and there is no reversing of polarity. The north always travels upon the left and the south down on the right. The polarity may be reversed by changing the connections of the direct current supply but the polarity makes little difference in the operation. By feeding the coils with alternating current so that there is one revolution per half cycle of alternating current, then the polarity reverses with each revolution, which is a rotating magnetic field and induces in a secondary another alternating current.

Turning back to Fig. 1 and remembering the explanation of Fig. 7 it will be obvious how an alternating current can be induced in the coils 45 by the rotation of the movable coils. Such coils 45 can also be used on Fig. 3. However, the two units should be entirely disconnected from the remaining circuits there shown, a direct current lead connected with terminal 26; terminal 20 and 23 are connected together; and the other direct current lead connected with 27. The units are then in series with a direct current source. With the polarities of the sets of coils as shown in Fig. 1 then these counter electromotive forces function properly. When one unit only is used, then in a half revolution the forces aid the motor and oppose it the other half. Taking the coils in the position as they are shown and rotating them clockwise by the motor 35 fed from some outside source, at A the resultant will fall; at B rise. Therefore the alternate currents induced in the coils 45 at A and B are exactly in opposition as to direction of flow, but they can be connected together so that they work together. To do this it is only necessary to connect upper terminal of coil 45 at A with upper terminal of coil 45 at B, the remaining two being the alternating current leads.

Suppose the two units now shown in Fig. 1 are combined with two similar units in which the rotary coils are at right angles to those shown in Fig. 1 and all rotary coils mounted upon the same shaft, then it becomes possible to generate polyphase E. M. F.'s in the coils 45 of the combined units. When the lines of force in the set of units in which the rotary coils have the position shown in Fig. 1 begin to fall, those in the other set of units will have been falling for an arc of 90°. In other words, the latter set are in advance of the former set with regard to the fall of magnetism, hence the E. M. F.'s induced in the coils 45 of one set will be behind those of the other set by 90° in phase. These polyphase E. M. F.'s cause polyphase currents to flow in the several coils 45, which currents may be employed as such, currents usually are. Any number of such units as Fig. 1 may be combined with the rotary coils of each set given a phase displacement from the others, then any number of phases can be drawn from the several coils 45.

In the above cases where the coils are not paired as explained under Fig. 7, power will be consumed unless they are so paired or provided with other means in some uses such as a flywheel for instance which flywheel may be constituted by the rotating core and coil. In this connection I will call attention to my article on "New commutatorless A. C. and D. C. machine" page 1144 in the "*Elec-* *trical Experimenter*" (now "*Science and Invention*") for March, 1920, in which a complete exposition of the above principle and this and other appartus is given. Instead of using these currents as alternating current they can be rectified by such a rectifier as shown in Fig. 1. The direct current of any value will have been converted to another direct current of any desired value by a method as flexible and free of opening and closing contacts as any alternating current transformer.

Let the secondary coils 45 be open, that is, on no load then the coöperating coils as primary will choke out the direct current in a manner similar to an alternating current transformer on no load and will therefore be self-regulating just like alternating current transformers. To explain in a few words, take the units A and B in a half revolution when connected in series for the purpose of transforming by mutual induction, then B will cause a resultant to rise which induces a counter electromotive force tending to choke out the current (on no load);
at A the current is aided by a falling resultant, but since the units are in series and the rising resultant and decrease of current at B are caused by the opening of the coils into the inductive stage, any increase of current at A can not pass because B is becoming inductive and any rise of current in the circuit is choked. In this case the rise and fall of the resultants must not be simultaneous, the rise of one must occur first and then the fall of the other take place as explained in my copending application Serial No. 354294. This is also one other reason why the units must be paired. Therefore at B not only is the current in its own coils reduced to near zero but also any other current is prevented from entering because the entering current tends to increase the lines of force also the same as does the opening of the coils and rising of resultant lines. Thus the two actions aid each other in choking out the primary direct current only enough current flowing to overcome the resistance of the coils and to produce enough flux to overcome hysteresis. The next half revolution reverses the conditions of the units, but the actions and reactions remain the same; and so for any number of units for polyphase working. Suppose the current is switched on while the units are in rotation, then no current can enter, on no load, because they are in series and one or the other of the units is inductive. The various descriptions of Fig. 1 given heretofore make clear how the choking out of the primary is accomplished.

The motor 35 may receive current from the coils 45 after the apparatus has started. Any frequency can be had by changing the speed, but the coils are wound best for a certain frequency and thus speed. Increasing the speed above the frequency the coils are wound for, will increase the impedance and therefore by varying the speed we have a means for regulating the current flow with secondaries closed. The apparatus of Figs. 1 and 3, whether actuated by self or mutual induction, can be used with dynamos and motors as a substitute for a commutator; and that as a unitary structure.

The rectifier shown at Figs. 3 and 5 is also reciprocal. Here the principle is the same as that disclosed in connection with Figs. 1 and 4 but the method of operating is different for giving the coöperating coils their different properties. An understanding of Figs. 1 and 4 will therefore make Figs. 3 and 5 readily comprehensible. An alternating current source feeds primary coils 57 of the transformer 58. The secondary 59 is split as in Fig. 1. The end terminals 60 and 61 lead to two units C and D respectively. Units C and D are similar. At C 62 is an iron core upon which are wound coils 63 and 64 in a differential manner. The lower terminals of both coils unite at 65 which in turn connects with end terminal 60 of the secondary 59. The upper terminals of coil 63 of both units unite at 66 and form one terminal 67 of the direct current line. The other direct current line 68 goes to the central point 69 of the split secondary 59. The upper terminals of the coil 64 at both units make and break contact alternately through the vibrating lever 70 of a polarized relay 71. This relay is in a shunt circuit of the secondary 59 and makes connection at 60 and 61. A condenser 72 is in circuit with relay 71 to neutralize the self-induction of the relay windings. A connection 73 unites terminal 66 and lever 70. The coil 64 at C being cut out, unit C is inductive or non-differential, while the coils at D are non-inductive or differential.

As the apparatus is set, current flowing in the secondary 59 at this instant can pass through D but not C. The arrows show the path of the current through D, which however, may be in either direction. As the current in the secondary reverses or starts the reverse half cycle, the relay throws the lever 70 in the opposite way which opens the coil 64 at D and closes the same coil at C. The operation of the relay is the same as that of the well known polarized telephone ringer and therefore needs no special comment. This reversed cycle then finds C open and D closed. Each succeeding cycle passes through the same process and a unidirectional current appears on lines 67 and 68. The lever 70 operates in synchronism with the secondary alternating current waves and therefore the units C and D are made inductive and non-inductive in synchronism with the alternating current waves. The relay 71 is so wound that its core is fully magnetized on the small current flow at the start of the wave. The lever 70 has spring or follow up contacts so that a breaking and making of contacts becomes practically simultaneous. If the contacts do not make simultaneously, or if the relay does not respond at the start of current rise, there will be a break between the pulsations on the direct current line, that is, the beginning and end of each half cycle will be broken off or cut out.

Now to explain the above Fig. 3 in its reciprocal function, take the position of the lever when the relay is inert and in which the lever 70 engages both of its contacts, apply a direct current at 67 and 68 and cut off the alternating current supply from primary 57. The direct current flows equally well as far as induction is concerned through both units, therefore one-half of current from the direct current source appears in each unit. Let the relay be operated from an outside source at present. Now let the lever 70 reverse and open coil 64 at D and close the same at C. The magnetism at D tries to rise but self-induction prevents it and the direct current is choked out of D. Since C is now differential more direct current flows into it. All the direct current now flows through C and none through D. The reversing of the lever again reverses the order of current flow in the units. Each throw of the relay lever causes a similar shifting of currents between the units and of course through the winding 59 which now has its function reversed and becomes a primary. In the winding 57, now a secondary, an alternate electromotive force is set up. Coil 64 at D should break at the same time 64 at C makes, so that the greater current flow through C can at once find a path through parallel circuit now created at C, otherwise the direct current will be choked out of D and cannot flow at once into C because this is then inductive, till contact is made.

When the several relays 71 in several sets of apparatus such as Fig. 3 make and break each out of phase with the other, then polyphase currents can be had from the several secondaries 57 when the latter are properly connected together.

Also several of these pieces of apparatus as rectifiers can be placed in series and each rectifier has the opening and closing of its contacts in a regular phased period one behind the other. The throw of the lever can be in phase in each unit with an alternating current of different phase, and when all are superposed unidirectionally there results a continuous direct current flow. Since a polyphase system produces a direct current and the rectifiers are in series, this is equivalent to having a battery or other source of direct current in series with the equipment of Fig. 3 and thus the direct current is shifted from one unit to the other in synchronism with the waves of the alternating current to be rectified. As a reciprocal of a rectifier and after starting, the relay can be supplied with the alternating current transformed from the direct current and run automatically. No sparking takes place because the "Lenz" or induction law is reversed. To explain, when a contact is opened there is no magnetism as it must first tend to appear; when the contact is made the magnetism tends to disappear. When Fig. 3 is used as a mutual induction transformer, the units are preferably connected in series as is the case in Fig. 1.

It has been proposed, prior to this disclosure, to obtain the results aimed at herein, but in all these systems, the coils which aid and oppose each other in alternate successive periods were not wound together or wound or placed over each other, hence more or less power must be consumed in driving the rotary elements and when the elements should create a period of absolute inertness, that is, be absolutely free from self-induction, they can not do so because of the arrangement of the coöperating coils, whereby consequent poles are produced instead of an absolute neutrality of polarity. In the coil arrangement shown and described herein, the coils are wound together or wound or placed over each other and being disposed differential and non-differential in alternate succession, the coils act perfectly, because when differential, they are absolutely non-inductive and when non-differential, they give the maximum inductive effect of which a coil of their number of turns is capable of; this is so because in both cases both magnetic fields of both coöperating coils are within the same space. This arrangement of coils described herein also reduces the power to drive them to zero, disregarding friction, of course, for the present. This arrangement of coils is very important and makes all the difference between success and failure. The inert period in my system is known and recognized in the art as "differentially wound" and "non-differentially wound" in the active period, whereas the coils of the other systems in the inert period are wound in a way known and recognized in the art to produce "consequent polarities" while in the active period they are merely two separate electromagnets with their unlike poles adjacent each other. In differential wound coils no polarity whatsoever appears.

While I have herein shown and particularly described equipment that may be employed as embodiments of apparatus of my invention and to enable me to practice the method thereof, I do not wish to be limited to the precise details of circuit and arrangements of equipment illustrated but having thus described by invention I claim as new and desire to secure by Letters Patent the following:

1. An electromagnetic rectifier and current redresser comprising a source of supply current, a transformer with a split secondary, two current throttling units, and a work circuit; said units provided with means for causing said throttling action and providing two paths of flow for said supply current, each of said units consisting of a magnetic path and two coils, one of said coils being wound or placed over the other and both surrounding said magnetic path; said throttling means of said units operating in synchronism with the waves of current passing or tending to pass through them; said waves when passed appearing on said work circuit of a nature opposite to that of the supply current.

2. An electromagnetic rectifier and current redresser comprising a source of supply current, a transformer, a plurality of current throttling units, and a work circuit; said units provided with means for causing said throttling action and providing several paths of flow for said supply current; each of said units consisting of a magnetic path and two coils, one of said coils being wound or placed over the other and both surrounding said iron magnetic path; said throttling means of said units operating in synchronism with the waves of current passing or tending to pass through them; said waves when passed appearing on said work circuit of a nature opposite to that of the supply.

3. An electromagnetic rectifier and current redresser comprising a source of supply current, a transformer with a split secondary, two current throttling units and a work circuit; said units provided with means for causing said throttling action and providing two paths of flow for said supply current; each of said units consisting of a magnetic path and two conductors one of said conductors being wound or placed over the other and both surrounding said magnetic path, said throttling means of said units operating in synchronism with the waves of current passing or tending to pass through them; said waves when passed appearing on said work circuit of a nature opposite to that of the supply current.

4. An electromagnetic rectifier and current redresser comprising a source of supply current, a transformer, a plurality of current throttling units and a work circuit; said units provided with means for causing said throttling action and providing several paths of flow for said supply current; each of said units consisting of a magnetic path and two conductors, one of said conductors being wound or placed over the other and both surrounding said iron magnetic path; said throttling means of said units operating in synchronism with the waves of current passing or tending to pass through them; said waves when passed appearing on said work circuit of a nature opposite to that of supply.

5. An electromagnetic rectifier and current redresser comprising a source of supply current, two throttling units and a work circuit; said units provided with means for causing said throttling action and providing a path of flow for said supply current; each of said units consisting of a magnetic path and two grouped conductors and an individual one; one of said grouped conductors being wound or placed over the other and both surrounding said magnetic path; said individual conductor also surrounding said iron magnetic path; said throttling means of said units operating in synchronism with the waves of current passing or tending to pass through the individual conductor; said individual conductor constituting the work circuit; said waves when passed appearing on said work circuit terminals of a nature opposite to that of the supply current.

6. An electromagnetic rectifier and current redresser comprising a source of supply current, a plurality of throttling units and a work circuit, said units provided with means for causing said throttling action and providing paths of flow for said supply current; each of said units consisting of a magnetic path and two grouped conductors and an individual one; one of said grouped conductors being wound or placed over the other and both surrounding said magnetic path; said individual conductor also surrounding said iron magnetic path; said throttling means of said units operating in synchronism with the waves of current passing or tending to pass through the individual conductor; said individual conductor constituting the work circuit; said waves when passed appearing on said work circuit terminals of a nature opposite to that of the supply current.

7. In an apparatus of the character described, the combination of two units in exact opposition of phase with each other, each unit consisting of a primary composed of two superposed coils through which current is flowing and rotatable relative to one another, a magnetic circuit and a secondary coil surrounding said magnetic circuit, rotatable means for causing successive changes in the angular relationship between the primary coils of each unit, whereby a resultant magnetic flux is caused to rise and fall, said rise and fall of flux inducing alternating electromotive forces in said secondary coil.

8. In an apparatus of the character described, the combination of a primary composed of two superposed coils through which current is flowing and rotatable relative to one another, a magnetic circuit and a secondary coil surrounding said magnetic circuit, rotatable means for causing successive changes in the angular relationship between the primary coils, whereby a resultant magnetic flux is caused to rise and fall, said rise and fall of flux inducing alternating electromotive forces in said secondary coil.

In witness whereof I hereunto subscribe my name this 20th day of March A. D., 1914.

RICHARD A. ENGLER.

Witnesses:
FRANK C. KEESECKER,
DAN. J. HAAS.